(12) United States Patent
Nikander

(10) Patent No.: US 9,624,120 B2
(45) Date of Patent: Apr. 18, 2017

(54) METHOD FOR IMPROVING AN AIR CIRCULATION AND A WAY FOR HEATING AIR IN A GLASS TEMPERING OVEN

(71) Applicant: FERACITAS OY, Tampere (FI)

(72) Inventor: Risto Nikander, Tampere (FI)

(73) Assignee: Feracitas OY, Tampere (FI)

( * ) Notice: Subject to any disclaimer, the term of this patent is extended or adjusted under 35 U.S.C. 154(b) by 0 days.

(21) Appl. No.: 14/761,627

(22) PCT Filed: Jan. 17, 2014

(86) PCT No.: PCT/FI2014/000001
§ 371 (c)(1),
(2) Date: Jul. 17, 2015

(87) PCT Pub. No.: WO2014/111622
PCT Pub. Date: Jul. 24, 2014

(65) Prior Publication Data
US 2015/0353411 A1    Dec. 10, 2015

(30) Foreign Application Priority Data

Jan. 18, 2013 (FI) ..................................... 20130010
Aug. 20, 2013 (FI) ..................................... 20130238

(51) Int. Cl.
C03B 27/044 (2006.01)
C03B 27/04 (2006.01)
C03B 29/08 (2006.01)

(52) U.S. Cl.
CPC ........ *C03B 27/044* (2013.01); *C03B 27/0404* (2013.01); *C03B 29/08* (2013.01)

(58) Field of Classification Search
None
See application file for complete search history.

(56) References Cited

U.S. PATENT DOCUMENTS

| | | | | |
|---|---|---|---|---|
| 5,047,077 A | * | 9/1991 | McMaster | C03B 27/0404 65/114 |
| 2004/0148969 A1 | * | 8/2004 | Nikander | C03B 29/08 65/114 |

FOREIGN PATENT DOCUMENTS

FI   111006   5/2003

\* cited by examiner

*Primary Examiner* — Lisa Herring
(74) *Attorney, Agent, or Firm* — Berggren Inc.

(57) ABSTRACT

A method comprising the claimed oven, blowing units, and heaters inside a blowing chamber in an oven where convection air is blown through nozzle rows and wherein a roll space and a suction space are separated with the help of pressure from each other by extending the length and/or width of a spacer plate which measures essentially larger than the length and/or width of a spacer plate or by arranging gaps or part which constricts the flow of the convection air between the roll space and the suction space where the gaps or part has an effect on the pressure of suction channels, suction channels extension, or of the suction space so that the convection air is sucked at least mainly from the rolls space through the mentioned suction channels, suction channels extension, and the suction space.

8 Claims, 5 Drawing Sheets

# METHOD FOR IMPROVING AN AIR CIRCULATION AND A WAY FOR HEATING AIR IN A GLASS TEMPERING OVEN

Object of the invention is a method for tempering glass in an oven in which oven the glass is moved while resting on rolls in horizontal plane and during the heating of the glass a significant part of heating occurs with convection air which is circulated with the help of one or several blowing units which air is heated with heaters which are located inside a blowing chamber and are mainly longitudinal regarding the oven after which the air is blown towards the glass through nozzle rows.

BACKGROUND

Figure 9:
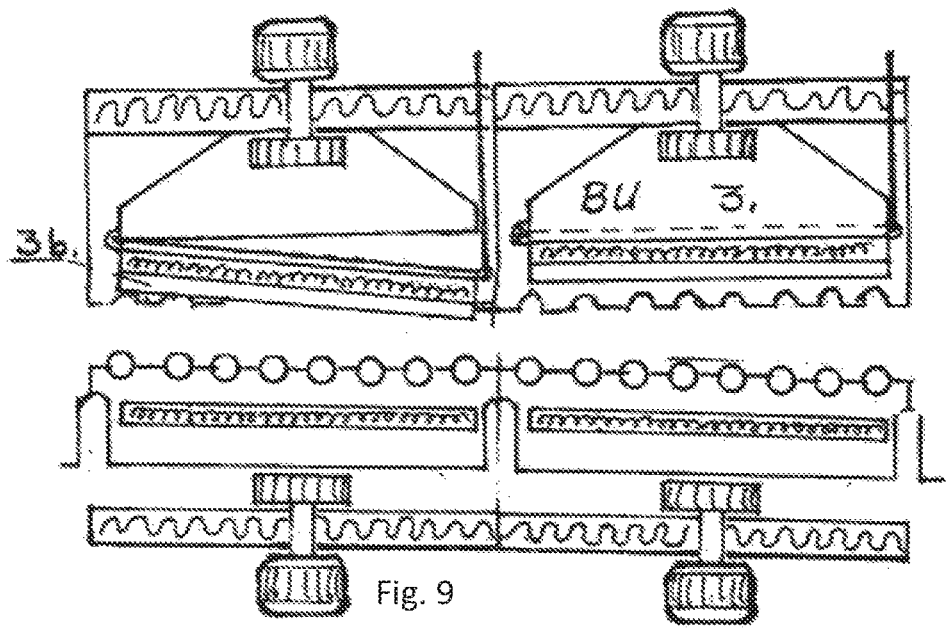
Figure 10:
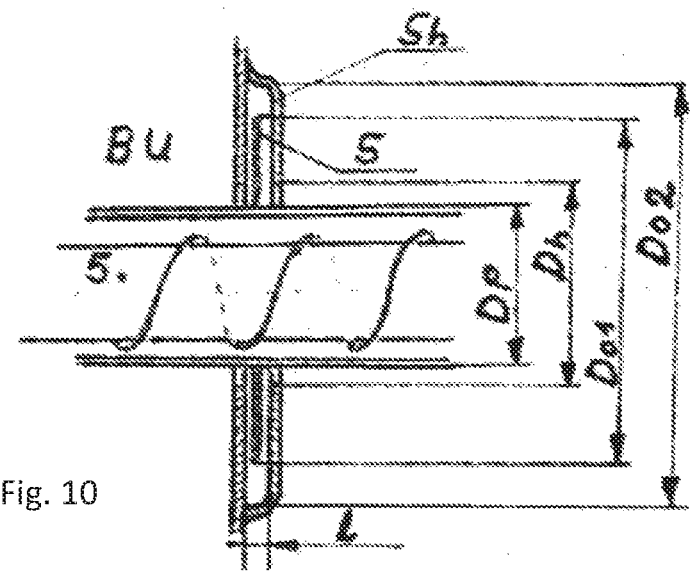

A Finnish patent FI-111006 and a U.S. Pat. No. 7,290,405, FIGS. 10 and 11 show a convection arrangement which in practice has proven to be very efficient and well functioning. In the arrangement the pipes of the heaters must be taken through each air channel (nozzle section). The sealing between pipes and channels must be made well. There is a large number of points to be sealed. Making of perforations and sealings causes unnecessary costs and loss related to escape of convection air. The requirement of an efficient convection is the fact that convection air showers meet the glass with great speed. Arrangements according to the FIGS. 7, 8, and 9 of the patent FI-111006 has also been realized but have been found to be much weaker. The reason is the fact that return air cycle interferes with convection air showers and reduces the incidence speed of the air showers coming from the nozzles to the glass. Figure A clarifies the disadvantage of the return flow for convection showers. The capacities of these kind of convection arrangements are approximately 20-40% lower than the methods according to the FIGS. 10 and 11 of the patent FI-111006 depending on the glass type. In addition to that convection air showers should have a heating profile required by each load of glass. Air flowing to the sides also weakens hugely the heating profile. The method according to the patent FI-111006 has thus been found to be the best and the most inexpensive convection arrangement in which method convection air shower areas and exit air areas alternate in relation to the direction of motion of the glass on transversal sectors. The methods according to the FIGS. 1-6 of the patent FI111006 cannot be realized so that they would be technically correct regarding the air flow and reasonable regarding their costs.

One section which has disadvantages in the patents FI111006 and FI20030482 the patent application 2013 0238 relates to the changing of the heaters. It must be performed at the end of the oven because the heaters are long and they are inside casings or pipes. The other disadvantage of the heaters is the fact that the adjusting of the temperature of the oven in a longitudinal direction is difficult, an example is the transverse heaters of the oven described in the patents FI111006 and FI20030482. The third disadvantage is the fact that the mentioned ovens FI 20030482 have long nozzle casings and the oven FI111006 has long pipes for the heaters. The control of their thermal expansion is difficult in relation to other structures, especially in relation to blowing units located in stationary points. Sealings in the thermal expansion points are difficult to realize and escape of the convection air causes loss of power and energy loss.

Efficiency of the convection can be increased, the temperature profile can be improved, the loss of convection air can be reduced and costs can be cut when one acts in the innovative way described in the following:

SHORT DESCRIPTION OF THE DRAWINGS

Figure 1:
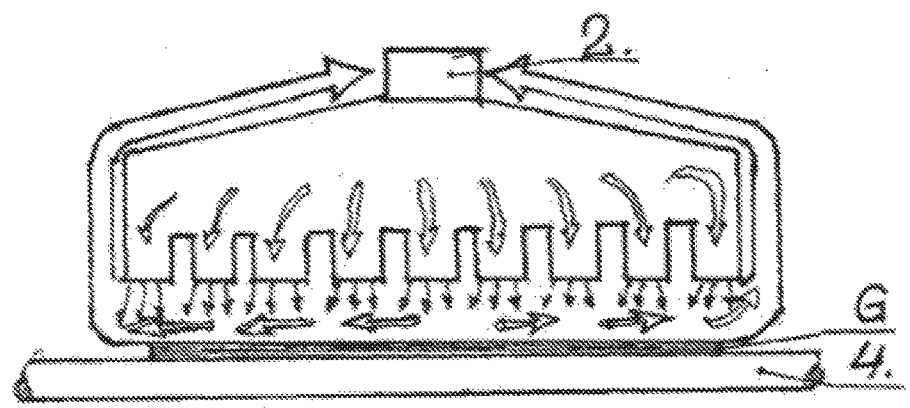
Figure 2:
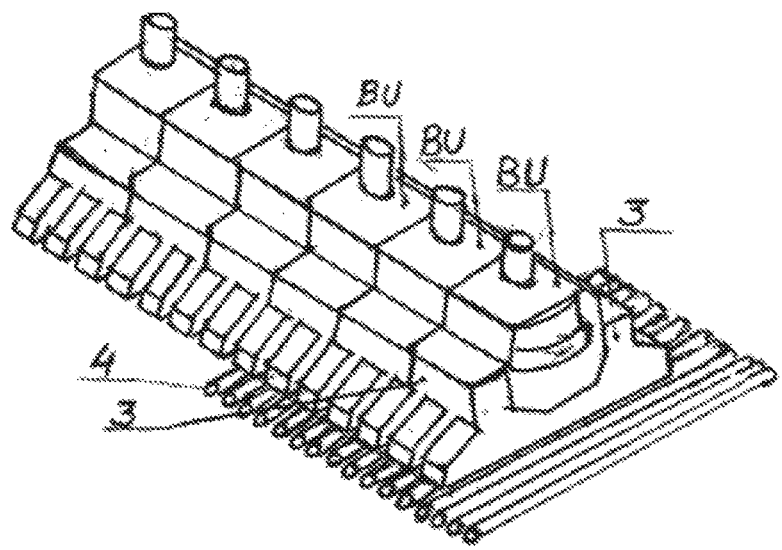
Figure 3A:
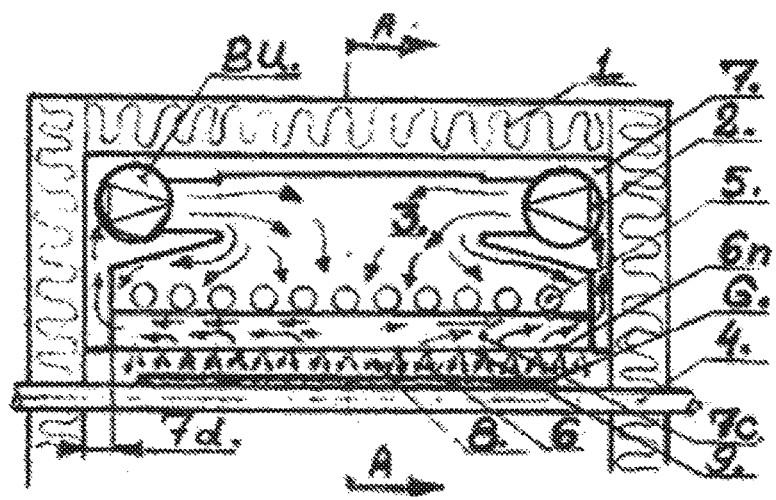
Figure 3B:
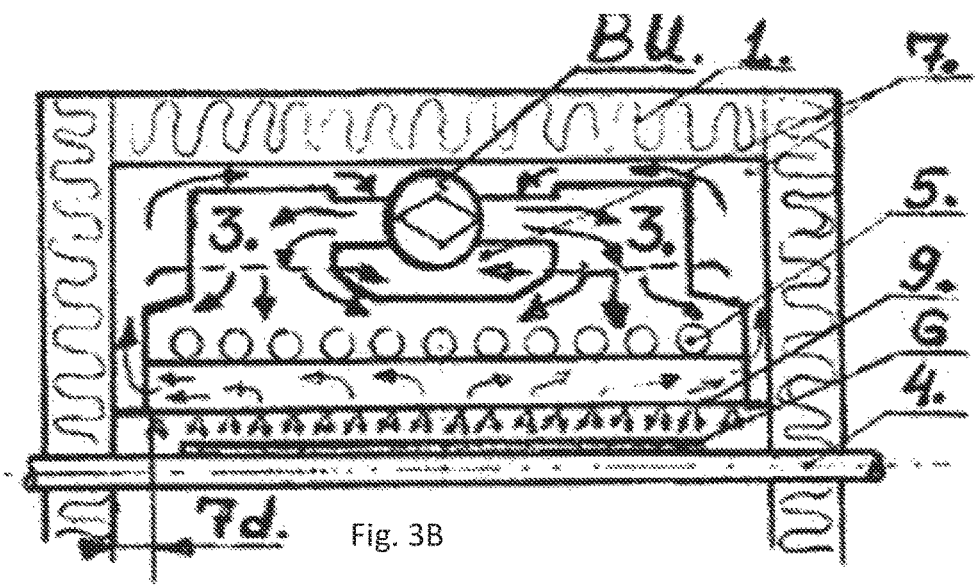
Figure 4A:
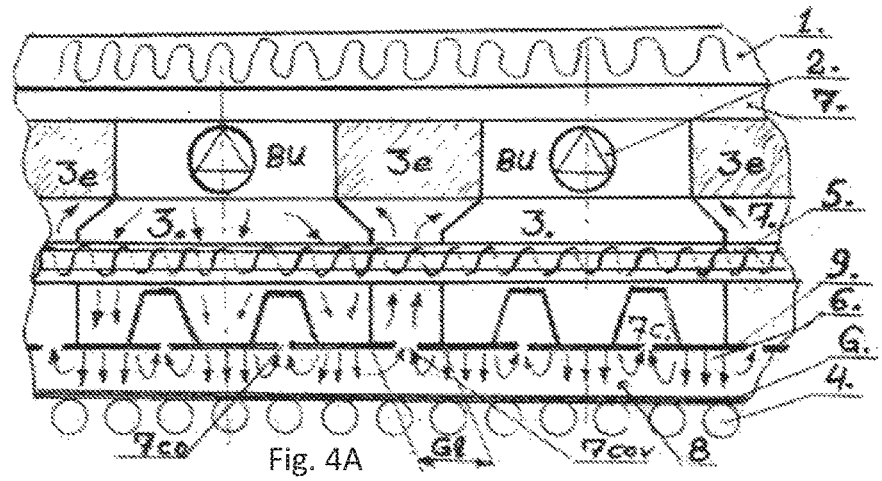
Figure 4B:
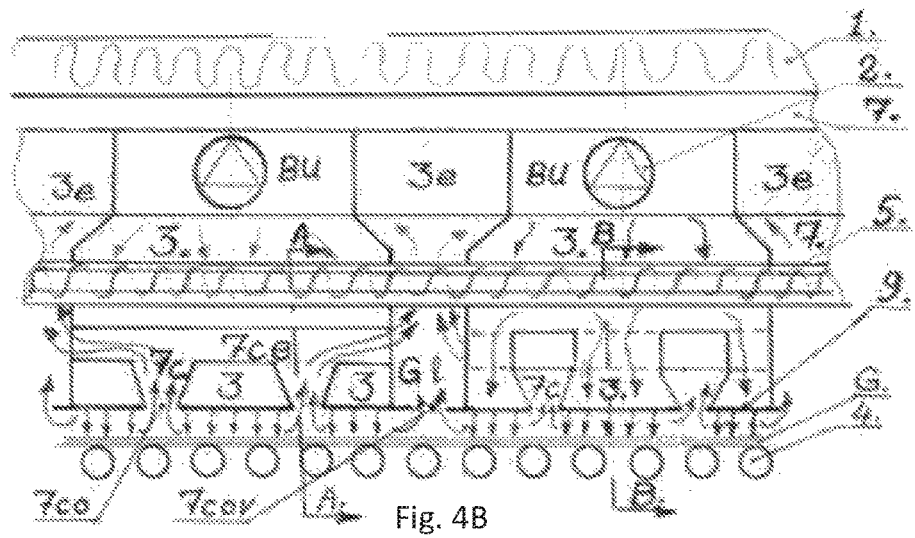
Figure 4B:
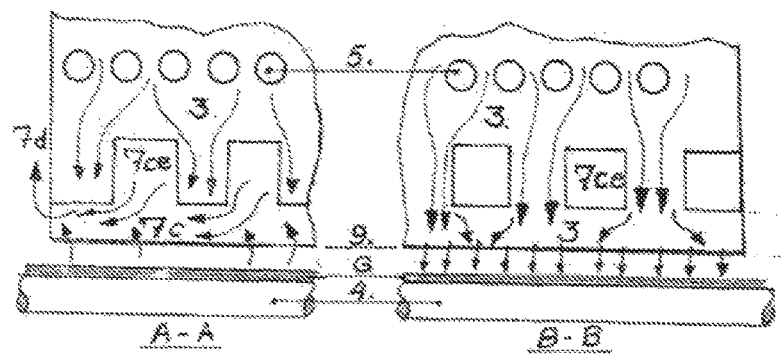
Figure 5:
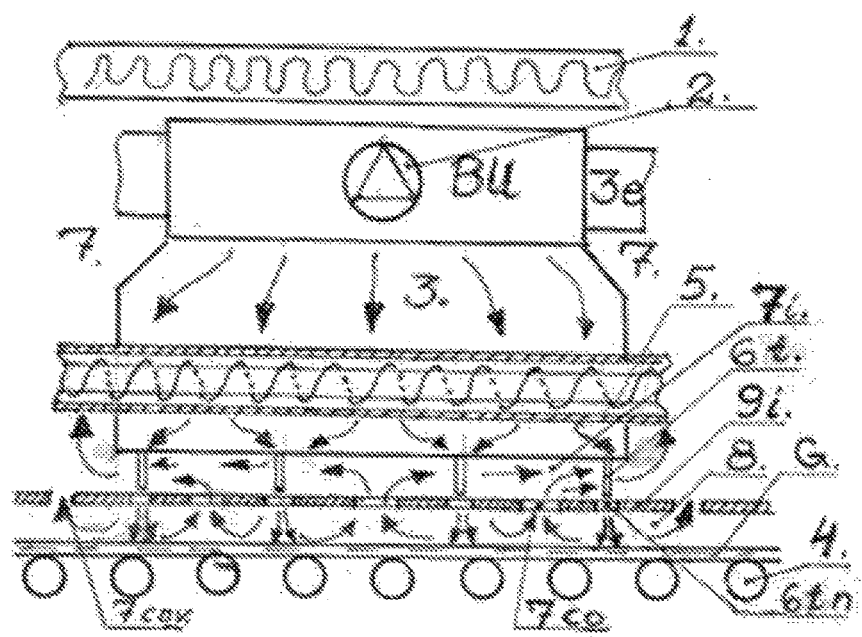
Figure 6A:
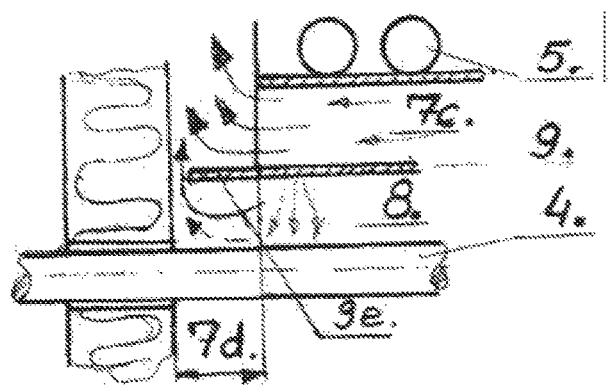
Figure 6B:
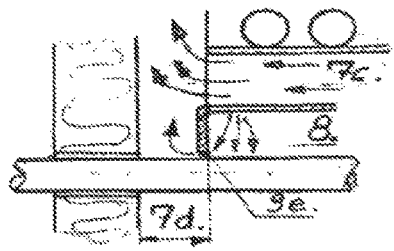
Figure 7:
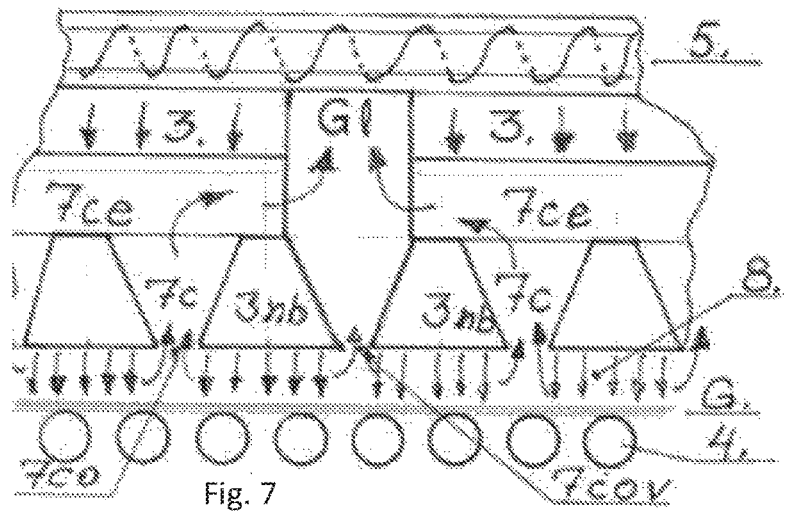
Figure 8:
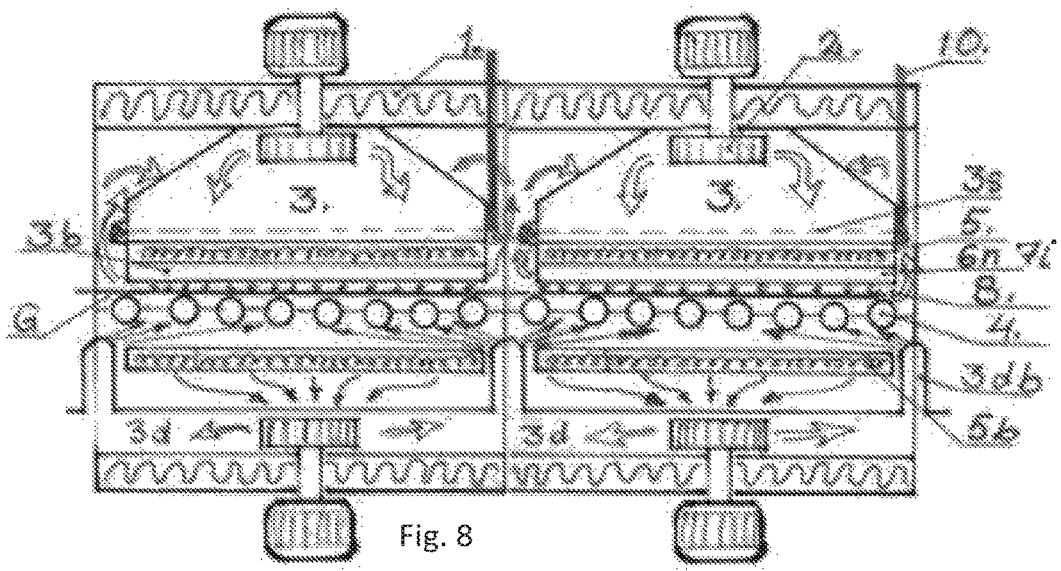

FIG. 1 shows a prior art solution.
FIG. 2 shows a prior art solution.
FIG. 3A is illustration of a cross section of the oven.
FIG. 3B is illustration of a cross section of the oven.
FIG. 4A is illustration of a side view of the oven arrangement.
FIG. 4B is illustration of a side view of the oven arrangement.
FIG. 5 shows an alternative return circulation of the air.
FIGS. 6A, 6B and &C show details of the part between the wall of the oven and blowing unit.
FIG. 7 is illustration of structure of two blowing units.
FIG. 8 is illustration of the oven structure.
FIG. 9 shows the upper part of the oven lifted to an upper position.
FIG. 10 shows a sealing arrangement between the heaters and the wall of the blowing chamber.

DETAILED DESCRIPTION OF THE INVENTION

FIG. 1 shows a disadvantageous return air flow which is directed sidewards which return air flow interferes with the efficiency of the convection air showers. This disadvantage can advantageously be removed in the way which is described in this application.

FIG. 2 shows an efficient convection according to the patent FI111006 during which blowing units (BU) are arranged inside the tempering oven one after another above the rolls 4. The heaters 5 are most advantageously installed inside the pipes which pipes penetrate the walls of the nozzle casings which are located to be an extension to the blowing chamber 3.

FIG. 3A shows a cross section of the oven 1 in which oven the blowers 2 are located at both sides of the blowing chamber 3. The air from the blowers is directed from between the heaters 5 to the rows 6n which are penetrated into the wall 9, the convection showers are directed to the glass G which moves on the rolls 4.

FIG. 3B corresponds to FIG. 3A with the difference that the blowers which blow in two directions are located in the middle of the oven, such as is shown also in FIG. 2.

The blowing chamber extends to two sides of the blower but is combined underneath the blowers. Also the space underneath the blowers now belongs to the suction space. Depending on the output of the blower 2 they can be arranged to blow also into two consecutive blowing units regarding the direction of the oven in order to cut the costs.

The section A-A of FIGS. 3A and 3B shows how air is returned from the roll space 8 to the suction channel 7c shown as a section and along the channel into 7d which is part of suction space 7. The suction space comprises the whole upper part of the roll space 8 excluding the blowing chamber 3 and the blowers 2.

FIG. 4A is a side view of the oven arrangement which arrangement comprises blowing units BU one after another and a gap G1, is left between them. G1 is part of suction space between the blower unit. The majority, even almost all return air can be returned by utilizing the gap G1 into the suction space 7 in which case the width of the oven can be made smaller by reducing the measure 7d and the pressure loss of the return air flow can be reduced. Part of the air can further be returned along the channels 7c and along the space 7d. The parts 3e in the drawing illustrate intermediate ducts which combine the blowing chambers 3 to each other. Their purpose is to balance air flow between the blowing chambers 3 and enable the usage of the machine even though one of the heaters 5 might be broken. FIG. 4A also shows the essential feature of the invention, return air flows must be constricted above the roll space 8 and underneath the actual suction channels 7c by gaps 7co and 7cov so that the desired, controlled air flow can be created.

FIG. 4B shows an embodiment of the invention with the help of which a greater part or even nearly all return air can be returned through the gap G1. So that the flow in the direction of the oven in the roll space 8 would not increase so that it would interfere with the convection air showers, it is possible to add suction channels extensions 7ce above the suction channels 7c which channels are transverse in relation to them and longitudinal in relation to the oven. Through these channels a majority of the convection air produced by each blowing unit BU can be sucked into the suction space 7 through the gap G1. The section A-A in the figure illustrates suction channels 7c and suction channels extension 7ce at the location of the channel 7c. The section B-B is a section between the suction channels 7c. The nozzle casing extends from one edge of the oven to the other in which case the convection air showers cover evenly the width of the whole oven.

FIG. 5 shows an alternative return circulation of the air during which air channels which are like the suction channels 7c and suction channel extensions 7ce are not used but the return air is circulated into the suction space and back to the blowers in the return air space 7i which is between the lower wall of the blowing chamber 3 and the spacer plate 9i either in a longitudinal direction regarding the oven to the gap G1 or in a lateral direction to a space 7d or in both directions. There are gaps in the spacer plate 9i for tubular nozzles 6t or tubular nozzle rows 6tn are attached to them through which convection air showers are directed to the glass G. Gaps 7co, are pierced into the spacer plate 9i and gaps 7cov are left small enough which create the needed restriction which is needed to create the pressure difference between the roll space 8 and the suction space 7. The return air flows to the space 7i between the spacer plate 9i and the lower wall of the blowing chamber 3 and further to the suction space 7. For example largish gaps which are made for the tubular nozzles, separate holes or elongated holes can be used as gaps depending on how the nozzle rows are arranged and how underpressure distribution which is advantageous for the return air flows can be created. When the length of the tubular nozzles is adjusted to be such that they extend to the level of the spacer plate 9i, the return air flow moving in to the suction space 7 does not interfere with the convection air showers.

Figure 6C:
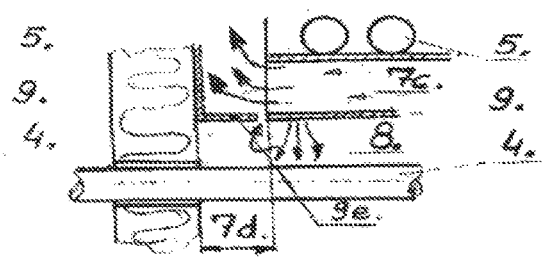

FIGS. 6A, 6B and 6C: Details are shown of the part between the wall of the oven and the blowing unit at the location of the suction channel 7c and/or details of the method according to the way shown in the FIG. 3. It shows how the roll space 8 must be separated at least mostly at the location of 7d, which is a part of the suction space 7 so that at most only minor underpressure is directed directly to the roll space 8, but underpressure and air flow are directed in a controlled way through the suction channel 7c, (suction channel extension 7ce) or through the return air space 7i.

Parts 9e in FIGS. 6A, 6B, 6C illustrate alternative restriction ways. One restriction way may also be the sizing and design of the blowing chamber in such a way that the right kind of restriction can be created.

FIG. 7 shows the reciprocal location and the advantageous structure of two blowing units BU and their blowing chambers 3 as a side view of the oven in which figure the nozzle casing part 3nb of the blowing chamber is broadened at its lower part and correspondingly the suction channel 7c is broadened at its upper part. Thus the desired restriction and pressure difference between the roll space 8 and the suction channels 7c and the suction space 7 can be created. In addition to that the nozzles can be spread to a wider surface area in which case the heat transfer becomes more effective.

FIG. 8 shows the oven structure which is described earlier but for clarity reasons the mentioned descriptions of the inventive parts of the air flows are mainly left out. The figure shows how the heaters 5 have now been built to have approximately the length of the blowing chamber 3 and how the blowing chamber is divided above the heaters 5 into two parts along the line 3s. The lower part 3b of the blowing chamber can be detached and lowered down either fully or can be equipped with hinges at its other edge. The heaters 5 which are located at the lower part of the blowing chamber 3 are most advantageously installed to the pipes. The heaters are attached at least nearly air-sealed to the walls of the blowing chamber at their ends or near their ends.

Underneath the glass an efficient convection heating is not needed because there is no coating underneath the glass. However, it is important to keep the temperature of the rolls 4 stable. Radiation is not good enough for this. That is why the heat transfer must be boosted with the help of the convection. Additionally, because the upper and lower heat regulation must be "synchronized", the upper and lower heaters 5b must be located on top of each other in relation to each other. In order to perform the necessary heat transfer advantageously and in the right way, the best way to perform it is to install the heaters underneath the glass which heaters correspond to the length and location of the upper heaters. Most advantageously the needed addition of the heat transfer can be realized with convection and nozzle casings 3db from between the lower heaters from which heaters air showers are directed to the rolls 4 in different angles being measured from the horizontal plane so that the convection is directed to all rolls.

FIG. 9 shows how the upper part of the oven is lifted to an upper position when the heaters are being changed. Then the part 3b can be lowered downwards in which case the changing of the heaters can be done easily. FIG. 9 shows the hinge alternative in order to lower the lower part 3b of the blowing chamber 3 into the lower position so that the heaters 5 can be pulled out and pushed in without the adjacent blowing unit BU interfering because there is no need to change the heaters. There is no need to present the cables of the heaters, connections, thermocouples and mechanisms of the lifting process because several known alternatives exist for them. The lifting device 10 can also be located on the top of the oven, if wanted. If one wants to lower down the lower part 3b in horizontal plane, the lifting devices are needed at both ends of the blowing chamber.

Organizing the needed additional length for the cablings, which is needed for lowering down the heaters, can be organized on top of the oven, if wanted, in which case a down/up movement possibility is arranged for them to that location.

FIG. 10: A sealing arrangement between the heaters 5 and the wall of the blowing chamber 3 in which arrangement holes Dh, which are considerably larger than the outer diameter Dp of the pipe, are machined to the wall of the pressure chamber and to the holder Sh of the seal while the hole of the seal part S is only a little bit larger than the hole of the outer diameter of the pipe. When the outer diameter Do2 of the holder of the seal is considerably larger than the outer diameter Do1 of the seal and the hole, which is left for the seal, is only a little bit larger than the thickness of the seal, a good enough sealing can be achieved for the convection air while the tube for heaters 5 can move in longitudinal direction and at the same time the tube for heaters can also move radially in every direction.

By realizing the isolation of the upper convection from the roll space 8 according to the FIGS. 6A, 6B, 6C, 7 with the arrangement in question the heaters 5 can be located immediately on top of the suction channels 7c, suction channel extensions 7ce or on top of the return air space 7i, most advantageously inside the pipes in which case numerous perforations can be avoided according to the FIGS. 10 and 11 from the patent FI-111006. With the help of this method manufacturing costs, difficulties caused by thermal expansions and sealing problems can be considerably decreased.

The mentioned disadvantages on the page 1-2 can be removed and one can achieve a) heat regulation also in the longitudinal direction regarding the oven in which case a "matrix" heat regulation can be created with the transverse profile of the heat, b) easily performed changing of the heaters and c) controlling of the thermal expansions and at the same time a nearly complete removal of escape air when one acts in the inventive way described in the following.

The invention claimed is:

1. A method for tempering a glass in an oven wherein the glass (G) is moved on rollers in a horizontal plane and is heated with convection air which is circulated with help of one or several blowing units (BU) and is heated with heaters which are located inside a blowing chamber and mainly located in a longitudinal direction with respect to the oven, wherein the convection air is blown towards the glass (G) through nozzle rows, wherein a roll space and a suction space are separated with help of pressure from each other, by extending the length and/or width of a spacer plate which measures essentially larger than the length and/or the width of the blowing chamber, or by arranging gaps or a part which constricts flow of the convection air between the roll space and the suction space wherein the gaps or the part has an effect on pressure of suction channels, suction channels extension, or of the suction space so that the convection air is sucked at least mainly from the roll space through the suction channels, suction channels extension and the suction space.

2. The method according to claim 1, wherein air returned from the roll space to the suction space and back to the one or several blowing units is mainly directed in the suction channels, suction channels extension and suction space between the nozzle rows.

3. The method according to claim 1, wherein a restriction and pressure difference between the suction space and the roll space is created by design and/or sizing of the blowing chamber.

4. The method according to claim 1, wherein the spacer plate, which has at least nearly the same direction as a lower surface of the blowing chamber, is arranged underneath the blowing chambers which spacer plate forms an intermediate suction space through which convection air showers are brought to the roll space with help of elongated nozzles rows and through which at least a majority of return air is sucked into the intermediate suction space with help of return air gaps arranged in the spacer plate.

5. The method according to claim 1, further comprising more than one blowing chamber wherein the gaps (G1) are arranged between the blowing chambers where the roll space and the suction spaces of the one or several blowing units (BU) are combined.

6. The method according to claim 1, wherein the blowing chamber is divided into two parts of which parts a lower part can be detached, lowered down or is hinged in such a way that it is possible to change the heaters.

7. The method according to claim 1, further comprising lower heaters in the oven divided into parts in a longitudinal direction with respect to the oven and further comprising circulating the convection air from a nozzle casing located in a space between ends of the heaters.

8. The method according to claim 1, wherein a sealing between the heaters and a wall of the blowing chamber is realized with a seal which is closed in a hole space between the wall of the blowing chamber and a holder (Sh) of the seal comprising a space larger than thickness of the seal and the seal is adjusted to have a form of a disc having an inner hole only a little bit larger than an outer diameter of the heaters and an outer diameter of the disc being smaller than an outer diameter of the holder of the seal.

* * * * *